UNITED STATES PATENT OFFICE.

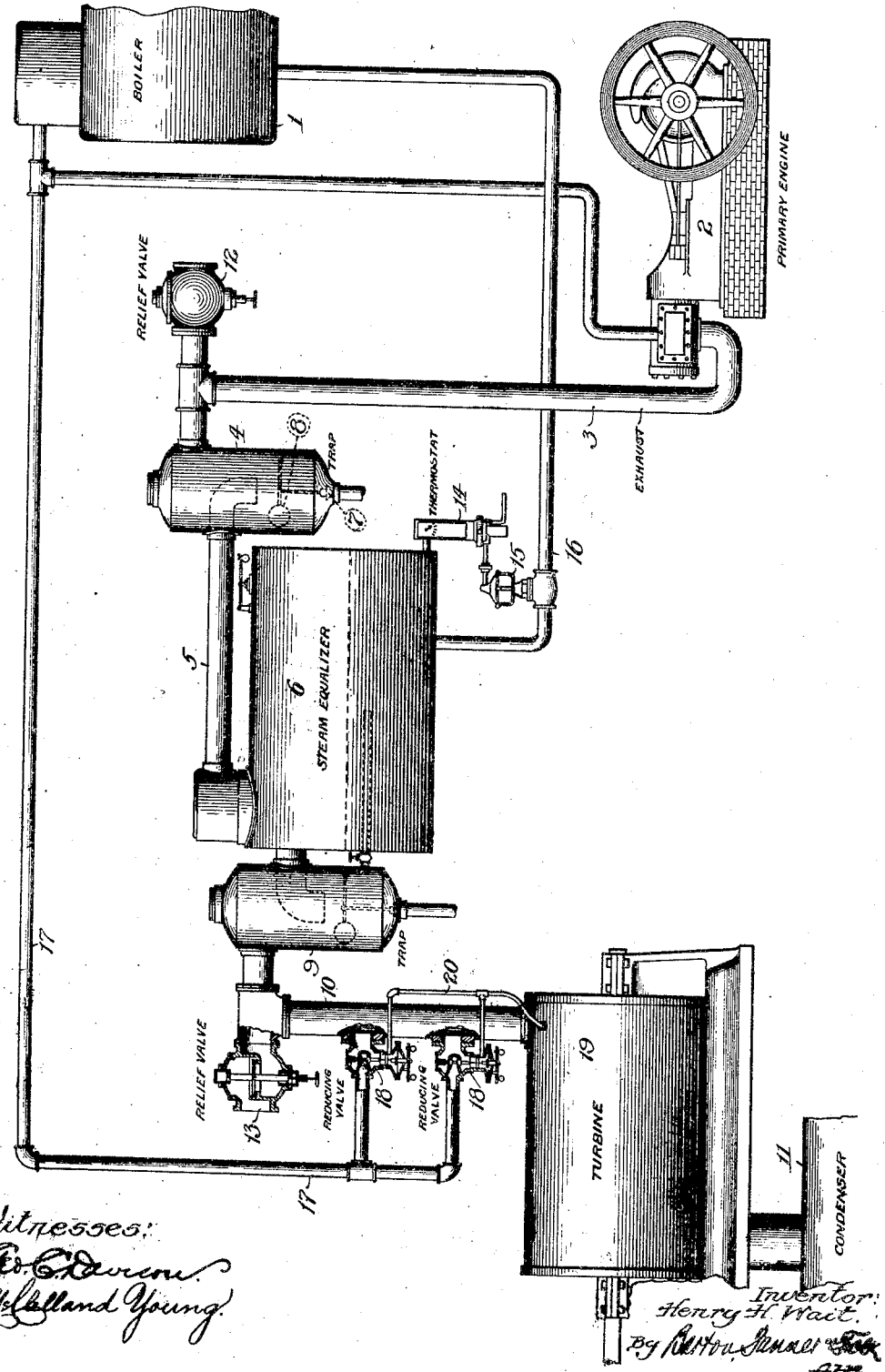

HENRY H. WAIT, OF CHICAGO, ILLINOIS.

APPARATUS FOR UTILIZING EXHAUST-STEAM.

938,357.   Specification of Letters Patent.   Patented Oct. 26, 1909.

Application filed September 30, 1908. Serial No. 455,565.

*To all whom it may concern:*

Be it known that I, HENRY H. WAIT, a citizen of the United States, residing at Chicago, in the county of Cook and State of Illinois, have invented a certain new and useful Improvement in Apparatus for Utilizing Exhaust-Steam, of which the following is a full, clear, concise, and exact description.

This invention relates to a system for utilizing exhaust steam, in which a low-pressure turbine or other secondary engine is operated by steam from an equalizer which in turn is supplied, intermittently or otherwise, with exhaust steam from a primary engine.

My object is to provide an improved system or organization of apparatus of this character which will automatically maintain proper conditions for the continuous, efficient and regular operation of the turbine or secondary engine, in spite of wide variations and interruptions in the quantity and pressure of the exhaust steam supplied from the primary engine.

One feature of the invention relates to an improved means for preventing back flow of water from the steam equalizer to the primary engine which might occur during a stoppage of the latter.

Another feature consists in the provision of improved means for supplying heat to the equalizer so that the latter may be operated as a secondary generator of steam when the supply of exhaust steam from the primary engine falls below the required amount, or is interrupted.

Another feature relates to the equalizing of pressure of the steam supplied to the turbine, and the prevention of undue surging of pressure throughout the system, while still another feature consists in the provision of improved means for automatically supplying to the turbine or secondary engine steam from an independent source, in quantities and at pressures just sufficient to meet the demands of such engine in case of overload, and to compensate for variations in the supply received from the equalizer.

I will describe my invention more particularly by reference to the accompanying drawing, which is a diagram indicating the principal or essential elements of the system and their relations to one another.

The primary engine 2, which is supplied with steam from the boiler 1, discharges its exhaust steam into a pipe 3 which leads to the upper part of a trap or vessel 4. Another pipe 5 leads from the upper part of this trap to the steam equalizer 6 which thus serves as a receiver for exhaust steam from the primary engine. The trap 4 has an automatic discharge valve 7 adapted to prevent the water in the trap from rising to a level at which it might enter the pipes 3 and 5, the valve being opened by a float 8 when the level of the water rises above a given point. Steam is conducted from the receiver or equalizer 6 through a trap 9 similar to the trap 4, and thence by a pipe 10 to a low-pressure turbine or other secondary engine 19 which is operated thereby, said turbine 19 discharging its exhaust into a condenser 11. An automatic relief valve 12 is provided between the exhaust of the primary engine and the equalizer, being preferably located just in advance of the trap 4. This valve is adjusted to open and permit the escape of steam in case of excessive pressure or surges of the steam delivered by the exhaust of the primary engine, but in the normal operation of the system will remain closed. A similar automatic relief valve 13 is provided between the equalizer and the turbine, preferably just in advance of the turbine, this valve 13 being adjusted to open upon an increase of pressure considerably less than that which will cause the other valve 12 to open. The valve 13 is for the purpose of relieving the turbine and the equalizer from any undue increase in pressure which might be caused by the delivery of more steam from the equalizer than the demands of the turbine require. This relief valve will remain open as long as the supply of steam from the equalizer is in excess of that required to carry the load on the turbine.

The steam equalizer 6 is a device adapted to receive exhaust steam in intermittent puffs from a primary engine, equalize the pressure thereof, store up the heat of such steam, as in a body of water maintained at approximately the boiling temperature, and deliver a substantially constant supply at a low pressure—preferably about atmospheric pressure—to the secondary engine or turbine, according to the demands of the latter and practically independent of the regularity or irregularity of the exhaust steam furnished to the equalizer by the primary engine. For this purpose the steam regenerator or accumulator of Rateau's patent No. 839,320, dated December 25, 1906, may be employed; but I prefer to make use instead of the steam equalizer of my application, Serial No. 455,564, filed September 30, 1908. So far as the present invention is concerned, however, the particular type of apparatus 6 to be employed is, generally speaking, immaterial, provided it be capable of performing the functions stated. Ordinarily such apparatus may comprise a body of water or other fluid adapted to store up the heat from the exhaust steam which is intimately mingled therewith, the water being maintained approximately at the temperature of vaporization so that upon any decrease in pressure caused by the withdrawal of steam to operate the turbine, additional steam would be immediately produced from the heated water to supply the demand until equilibrium should again be established. Such generation of steam from the heated water in the equalizer would take place principally during the periods of interruption in the supply of exhaust steam received by the equalizer from the primary engine. To maintain conditions such that steam may always be generated from the water in the equalizer upon a fall of pressure therein, I provide, in accordance with this invention, a supplementary means of supplying heat to said equalizer, with automatic regulating mechanism responsive to variations in the temperature in the interior of the equalizer, for controlling such supplementary supply of heat. As shown in the drawing a thermostat 14 which is connected with the interior of the equalizer, near the bottom thereof, so as to be responsive to variations in the temperature of the cooler portions of the water, is arranged to control a valve 15 in a pipe 16 which serves to convey hot water from the boiler 1 to the lower portion of the equalizer 6. The thermostat is arranged in a well known way to automatically open the valve 15 and admit hot water (or other fluid) to the equalizer when the temperature in the latter falls below a predetermined point. Thus in case the primary engine should be shut down for a period longer than that at which the equalizer would continue to generate steam from the previously-received exhaust, the thermostat would automatically cause hot water or steam to be supplied direct from the boiler, to maintain the water in the equalizer at approximately the boiling point.

Another feature of the invention consists in the provision of improved means for supplying live steam direct from the boiler to the turbine to operate the latter in case of severe overload or in case of failure of the equalizer to maintain a proper working supply of steam. As shown, a pipe 17 leads from the boiler to a number of automatic reducing-valve 18 which are adapted to deliver steam from said pipe to the pipe 10 leading to the turbine 19. The operating cylinders of these automatic valves are connected to a pressure pipe 20 leading from the turbine 19 near the inlet port thereof, or to any point between the equalizer and the turbine at which it is desired to maintain an approximately constant pressure. These automatic steam-supply valves or reducing valves 18 are set to open at different pressures, so that upon a continuous fall of pressure they will open consecutively, supplying more and more steam from the pipe 17 until the demands of the turbine are fully met. One of the advantages of this arrangement of a plurality of steam-supply valves of comparatively small individual capacity, set to open at different pressures, is that the steam is supplied to the turbine more gradually and with less shock than would be the case with a single valve of larger capacity.

I claim:

1. In a system for utilizing exhaust steam, the combination with a receiver containing a body of fluid for absorbing the heat from such exhaust steam and means for conducting regenerated steam from said receiver, of supplemental means for heating such fluid, and automatic regulating apparatus for said supplemental means, responsive to variations in temperature of the colder portion of such body of fluid.

2. In a system for utilizing exhaust steam the combination with a receiver for exhaust steam having fluid therein adapted to absorb the heat from such steam, and means for conducting regenerated steam from said receiver, of means for supplying hot fluid to said receiver and automatic means responsive to variations of temperature of the colder portions of the fluid in the receiver for regulating the supply of hot fluid.

3. In a system for utilizing exhaust steam the combination with a steam equalizer and means for conducting steam from said equalizer, of means for supplying heated fluid to said equalizer, a thermostat responsive to changes in the temperature within the colder portions of the equalizer, and an automatic valve controlled by said thermostat for regulating the admission of heated fluid.

4. In a system for utilizing exhaust steam, the combination with a receiver for such steam, containing a body of water adapted to absorb the heat thereof, means for conducting steam from said receiver, a source of hot water, a pipe adapted to supply hot water from said source to the receiver, an automatic valve in said pipe governing the water supply, and a thermostatic device responsive to variations in the temperature of the colder portions of the body of water in said receiver, for governing said automatic valve.

5. In a system for utilizing exhaust steam, the combination with a primary engine, of a steam equalizer arranged to receive exhaust steam from said engine, said equalizer having a body of water therein adapted to absorb the heat from such steam, a secondary engine connected to receive steam from said equalizer, relief valve mechanism for relieving surplus pressure in said system, a tank connected between said primary engine and said equalizer adapted to collect any water which may flow back from the equalizer toward said engine, and means for discharging the accumulated fluid from said tank.

6. In a system for utilizing exhaust steam, the combination with a steam engine, of a steam equalizer arranged to receive exhaust steam from said engine, said equalizer having a body of water therein, relief valve mechanism for relieving surplus pressure in said system, a trap connected between said engine and said equalizer by piping opening near the top of said trap, and an automatic discharge-valve for said trap adapted to prevent the water accumulated therein from rising to a level at which it would enter said piping.

7. In a system for utilizing exhaust steam, the combination with a steam equalizer and means for supplying steam thereto, said equalizer containing a body of water adapted to absorb the heat of such steam, of a secondary engine, relief valve mechanism for relieving surplus pressure in said system, a trap, piping adapted to conduct steam from said equalizer through said trap to the engine, said trap having an automatic discharge valve adapted to prevent the water accumulated therein from rising to a level high enough to enter the piping leading to the engine.

8. The combination with a primary engine, of a steam equalizer receiving exhaust steam therefrom, a secondary engine operated by exhaust steam from said equalizer, and a series of automatic relief valves for the steam, at intermediate points between the primary and secondary engines, said relief valves being adapted to open at different pressures.

9. The combination with a primary engine, of a steam equalizer receiving exhaust steam therefrom, a secondary engine adapted to be operated by exhaust steam from said equalizer, an automatic relief valve between the primary engine and the equalizer, and a second automatic relief valve between the equalizer and the secondary engine, said second relief valve being adapted to open at a lower pressure than that at which the first valve opens.

10. The combination with a steam equalizer and a secondary engine operated by steam therefrom, of an independent source of steam, and a plurality of automatic valves adapted to govern the supply of steam from said independent source to said engine, said valves being set to open successively at different falls of pressure of the steam which is delivered to said engine.

11. The combination with a primary engine, of a steam equalizer arranged to receive exhaust steam from said engine, said equalizer having a body of water therein adapted to absorb the heat from such steam, supplemental means for supplying hot fluid to said receiver at the lower portion thereof, automatic means responsive to variations in temperatures in the colder portions of the receiver for regulating the supply of such hot fluid, and a secondary engine connected to receive steam from said equalizer.

In witness whereof, I, hereunto subscribe my name this 21st day of September A. D., 1908.

HENRY H. WAIT.

Witnesses:
   Geo. C. Davison,
   Alfred H. Moore.